United States Patent
Barnard (10) Patent No.: US 8,204,374 B2
(45) Date of Patent: Jun. 19, 2012

(54) RECONFIGURABLE MULTICHANNEL (WDM) OPTICAL RING NETWORK WITH OPTICAL SHARED PROTECTION

(75) Inventor: Chris Barnard, Sunnyvale, CA (US)

(73) Assignee: Ciena Corporation, Linthicum, MD (US)

( * ) Notice: Subject to any disclaimer, the term of this patent is extended or adjusted under 35 U.S.C. 154(b) by 1001 days.

(21) Appl. No.: 11/190,109

(22) Filed: Jul. 27, 2005

(65) Prior Publication Data
US 2007/0025729 A1    Feb. 1, 2007

Related U.S. Application Data

(60) Provisional application No. 60/634,801, filed on Dec. 10, 2004.

(51) Int. Cl.
*H04J 14/02*    (2006.01)
(52) U.S. Cl. .............................................. 398/4; 398/85
(58) Field of Classification Search .................. 398/3, 4, 398/59, 83–85
See application file for complete search history.

(56) References Cited

U.S. PATENT DOCUMENTS

| | | | |
|---|---|---|---|
| 5,986,783 A | 11/1999 | Sharma et al. | |
| 6,046,833 A | 4/2000 | Sharma et al. | |
| 6,101,011 A | 8/2000 | Taylor | |
| 6,331,906 B1 | 12/2001 | Sharma et al. | |
| 6,414,765 B1 * | 7/2002 | Li et al. .............................. | 398/5 |
| 6,687,431 B2 | 2/2004 | Chen et al. | |
| 6,839,514 B1 | 1/2005 | Sharma et al. | |
| 6,885,822 B1 | 4/2005 | Chin et al. | |
| 6,918,070 B1 | 7/2005 | Sharma | |
| 6,956,687 B2 | 10/2005 | Moon et al. | |
| 6,985,648 B2 * | 1/2006 | Kish et al. ........................ | 385/14 |
| 7,221,873 B1 * | 5/2007 | Bock et al. ....................... | 398/84 |
| 7,231,148 B2 * | 6/2007 | Kinoshita et al. ................ | 398/83 |
| 7,583,432 B2 * | 9/2009 | Ghiggino et al. ............. | 359/337 |
| 2008/0131121 A1 * | 6/2008 | Magri et al. ..................... | 398/59 |

FOREIGN PATENT DOCUMENTS

WO    WO 0049751 A1 *    8/2000

OTHER PUBLICATIONS

"SONET Bidrectional Line-Switched Ring Equipment Generic Criteria," Generic Requirements, GR-1230-CORE, Issue 3, Dec. 1996.

* cited by examiner

*Primary Examiner* — Nathan Curs
(74) *Attorney, Agent, or Firm* — Clements Bernard PLLC; Christopher L. Bernard; Lawrence A. Baratta, Jr.

(57) ABSTRACT

A reconfigurable multi-channel (WDM) optical ring network with optical shared protection. Preferably, the shared protection is based on a channel optical shared protection ring. The reconfigurable multi-channel (WDM) ring network connects signals between add/drop nodes with reconfigurable optical add/drop multiplexers (ROADM). The ring architecture is used to provide redundant paths between any transmitter and receiver so that failure on one side of the ring does not cut the service. The optical shared protection ring supports full redundancy. The shared protection supports wavelength reuse and availability of protection bandwidth for low-priority traffic. The shared protection implementation can also provide full equipment redundancy including transponders if desired. The ROADM components allow for reconfiguration of the multiplexer from a remote site and can be used in a network having both shared and dedicated protection.

17 Claims, 6 Drawing Sheets a) Normal State

RECONFIGURABLE MULTICHANNEL (WDM) OPTICAL RING NETWORK WITH OPTICAL SHARED PROTECTION

CROSS-REFERENCE TO RELATED APPLICATIONS

This application claims priority under 35 U.S.C. §119(e) on U.S. Provisional Patent Application No. 60/634,801 filed on Dec. 10, 2004.

FIELD OF THE INVENTION

The present invention is directed to a method and apparatus for transmitting information over an optical ring network. In particular, the present invention is directed to a reconfigurable multi-channel (WDM) optical ring network utilizing optical shared protection and a method of transmitting information over this network.

BACKGROUND OF THE INVENTION

Various optical networks have been previously proposed for transmitting information including but not limited to audio, video and data from one location to another. Originally, the fiber optic industry used single wavelength transmission links. Multiplexing based on wavelength has been utilized more and more in optical networks to greatly increase transmission capacity over single wavelength transmission links. Specifically, wavelength division multiplexing (WDM) was developed to transmit two optical signals each having a distinct wavelength on a single waveguide. In response to the ever increasing demand, coarse wavelength division multiplexing (CWDM) was developed to further increase the transmission capacity of optical networks. CWDM allows generally up to eight different channels to be stacked in the 1550 nm range of the fiber called the C-Band. CWDM uses spacing of 20 nm. To accommodate even greater transmission capacity demands, dense wavelength division multiplexing (DWDM) has been developed to send a large number of closely spaced optical signals over a single fiber. DWDM systems have channels spaced as close as 0.4 mm.

Several companies have developed component or network products with reconfigurable add/drop multiplexers to permit remote reconfiguration of the wavelength division multiplexers to eliminate or reduce the requirement of a site visit to the node to alter or replace a fixed add/drop multiplexer to achieve the desired modification of the network. Examples of these reconfigurable add/drop multiplexers are the JDS waveblocker, the Corning waveblocker and the Photouris V32000.

Further, various protection systems have been employed in prior optical networks including channel optical dedicated protection ring (CH ODPR), multiplex section optical shared protection ring (MS OSPR) and channel optical shared protection ring (CH OSPR) to prevent transmission interruption in the event of a failure in a span of fiber or other network component.

It has not been previously known to use a reconfigurable add/drop multiplexer in an optical network having shared protection. Accordingly, previously known networks have been limited in various aspects.

OBJECTS AND SUMMARY OF THE INVENTION

It is an object of the present invention to provide a novel and unobvious optical network.

It is another object of the present invention to provide an optical network that does not suffer from the limitations of prior optical networks.

It is a further object of the present invention to provide an optical network that is designed to permit wavelength reuse and reconfiguration of the wavelength division multiplexer from a remote site.

It is still a further object of the present invention to provide an optical network that permits extra traffic to be carried on the protection path while also permitting reconfiguration of the wavelength division multiplexer from a remote site.

Yet a further object of the present invention is to provide an optical network that permits remote reconfiguration of the WDM, supports greater capacity per wavelength and permits wavelength reuse relatively easily.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an optical network for transmitting information including an optical ring having a plurality of nodes and at least two fibers interconnecting the plurality of nodes during normal operation of the optical ring. Each of the two fibers has a plurality of channels divided among working channels and protection channels. The working channels carry working traffic when no failures are present in the optical ring. The protection channels carry extra traffic when desired provided no failures are present in the optical ring. Further, the protection channels carry working traffic when there is a failure in a corresponding working channel. At least one of the plurality of nodes has a reconfigurable add/drop multiplexer permitting wavelengths to be added, dropped and expressed from a location remote from the location of the at least one of the plurality of nodes.

Another embodiment of the present invention is directed to an optical network for transmitting information having an optical ring having channel optical shared protection permitting extra traffic to be carried on at least one protection channel when no failures are present in the optical ring. The optical ring further includes at least one reconfigurable add/drop wavelength division multiplexer permitting wavelengths to be added, dropped and expressed from a location remote from the location of the reconfigurable add/drop wavelength division multiplexer.

A further embodiment of the present invention is directed to a method of transmitting information including the steps of: (i) providing an optical network having an optical ring including a plurality of nodes and at least two fibers interconnecting the plurality of nodes during normal operation of the optical ring, each of the at least two fibers having a plurality of channels divided among working channels and protection channels; (ii) providing at least one reconfigurable add/drop wavelength division multiplexer permitting wavelengths to be added, dropped and expressed from a location remote from the location of the reconfigurable add/drop wavelength division multiplexer; (iii) transmitting bi-directional working traffic on the working channels; and, (iv) transmitting extra traffic on at least one protection channel when no failures are present in the optical ring.

DETAILED DESCRIPTION OF THE PREFERRED EMBODIMENTS OF THE INVENTION

The preferred forms of the invention will now be described with reference to FIGS. 1-6. The appended claims are not limited to the preferred forms and no term and/or phrase used herein is to be given a meaning other than its ordinary meaning unless it is expressly stated that the term and/or phrase shall have a special meaning.

FIGS. 1 through 4

Figure 1:
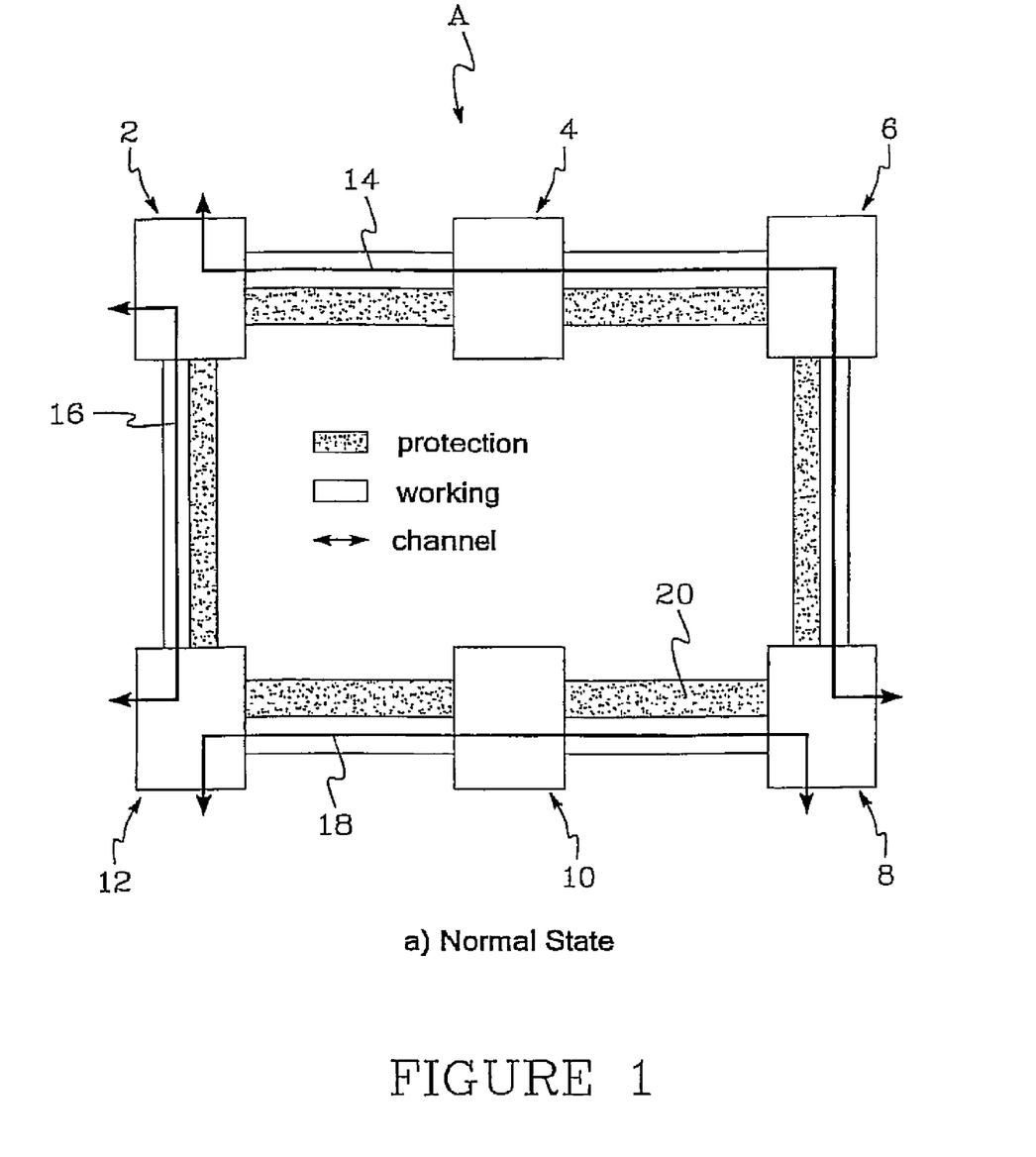
FIG. 1 is a schematic diagram of an optical network under normal operating conditions formed in accordance with a preferred embodiment of the present invention with portions thereof omitted to better illustrate the invention.

Referring to FIG. 1, an optical ring network A having channel optical shared protection is illustrated in the normal operating state/condition. The optical network ring A includes nodes 2, 4, 6, 8, 10 and 12. Preferably, optical network ring A utilizes two fibers between each node (i.e., span of the ring). On each fiber, half the channels are preferably defined as working channels and half are defined as protection channels. While six (6) nodes are shown in the optical network ring A, it will be readily appreciated that the number of nodes may be varied as desired.

Three working paths 14, 16, and 18 are illustrated in FIG. 1. Preferably, these working paths utilize the same working wavelength and are protected by a single protection wavelength 20. Wavelength reuse provides higher capacity per wavelength. It should be noted that when reusing wavelengths in multiple working paths, the working paths cannot overlap.

Figure 2:
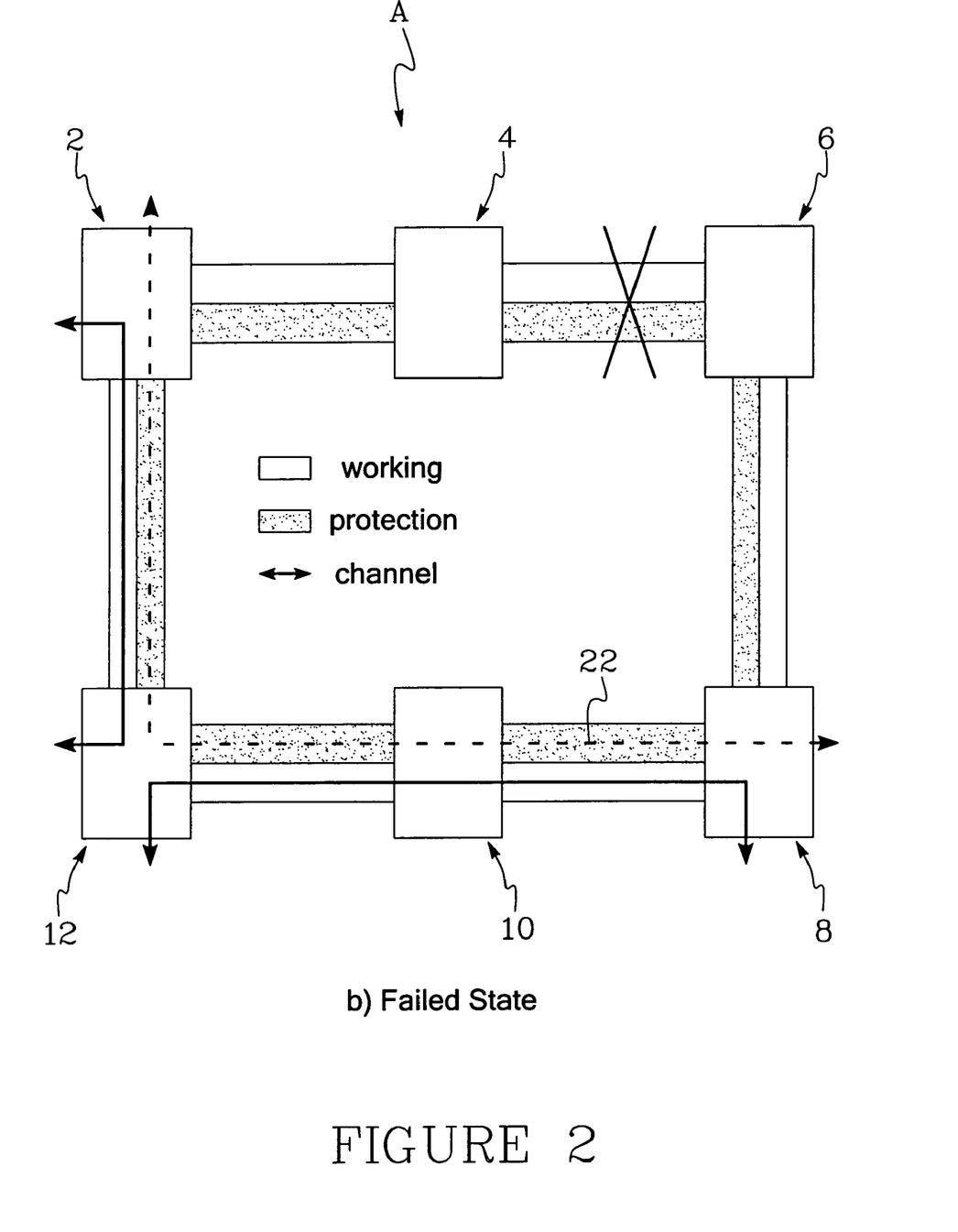
FIG. 2 is a schematic diagram of an optical network in a failed condition formed in accordance with preferred embodiment of the present invention with portions thereof omitted to better illustrate the invention.

Referring to FIG. 2, optical network ring A is shown in a failed state. Specifically, both fibers between nodes 4 and 6 are cut as represented by the X. In the event of a fiber failure of the type depicted in FIG. 2, the affected traffic is switched over to the protection path and re-routed around the opposite side of the ring A as indicated by the dashed line 22. Unlike other protection methods such as O-BSLR (i.e., optical bi-directional line switching ring), there is no optical loop backs in the CH-OSPR utilized in the preferred embodiment of the present invention.

Figure 3:
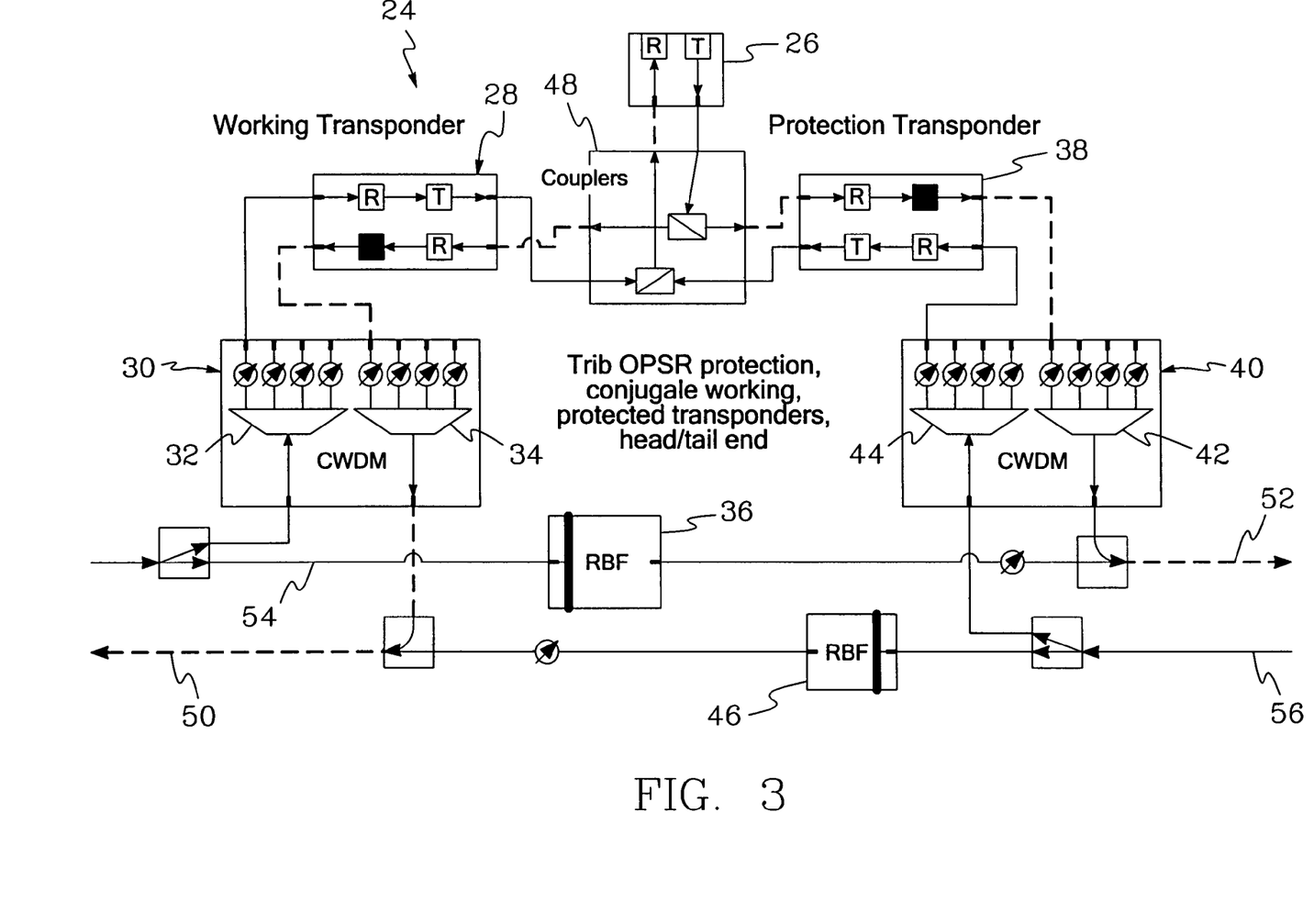
FIG. 3 is a schematic diagram of a head/tail node formed in accordance with a preferred embodiment of the present invention.

Referring to FIG. 3, one of many possible implementations of the ROADM (i.e., reconfigurable add/drop multiplexer) application in a network having shared optical protection is illustrated. Head/tail node 24 is operably connected to a transceiver 26. The head/tail node 24 includes on the working side a working transponder 28, a working coarse wavelength division multiplexer unit 30 having a pair of CWDMs 32 and 34 (one for each fiber) and a working reconfigurable wavelength blocking filter (RBF) 36. On the protection side, the head/tail node 24 includes a protection transponder 38, a protection coarse wavelength division multiplexer unit 40 having a pair of CWDMs 42 and 44 (one for each fiber) and a protection reconfigurable wavelength blocking filter (RBF) 46. Coupler 48 selectively connects the transceiver 26 to the working side and protection side.

Preferably, the architecture of ring A is based on a conjugate working wavelength assignment. However, it should be noted that in the event that conjugate wavelength assignment is used, the requirements of the ROADM are the same with the exception that the conjugate protection wavelength assignment does not support the single transponder embodiment illustrated in FIG. 6 since the protection and working wavelengths are different unless a tunable laser is used to tune the conjugate wavelength within a few ms. While full redundancy is shown in this node including transponder redundancy, it will be readily appreciated that the configuration of the node may be varied as desired.

The dashed line denotes the working wavelength 50 transmitted to the left and the protection wavelength 52 transmitted to the right. The solid line denotes the working wavelength 54 received from the left and the protection wavelength 56 received from the right.

If there are no failures, the protection wavelengths can be used to carry extra traffic. This would require a bridge and switch on the trib side (not shown) to selectively connect and release the source of the extra traffic (not shown) to the protection transponder 38.

In a normal state (i.e., no line failure or other network component failure) where no extra traffic is present, the connection of the protection transponder 44 should be squelched by variable optical attenuators (VOAs) inside the protection coarse wavelength division multiplexer unit 44. With extra traffic, i.e., when the source of extra traffic is connected to the protection path via the bridge and switch (not shown) on the trib side, the protection transponder 44 is added and dropped to the ring A, by reducing the attenuation of the VOAs in the coarse wavelength division multiplexer unit 44. This extra traffic is preferably low priority traffic. Traffic that is dropped at the node is blocked on the pass through by the corresponding reconfigurable blocking filter.

Figure 4:
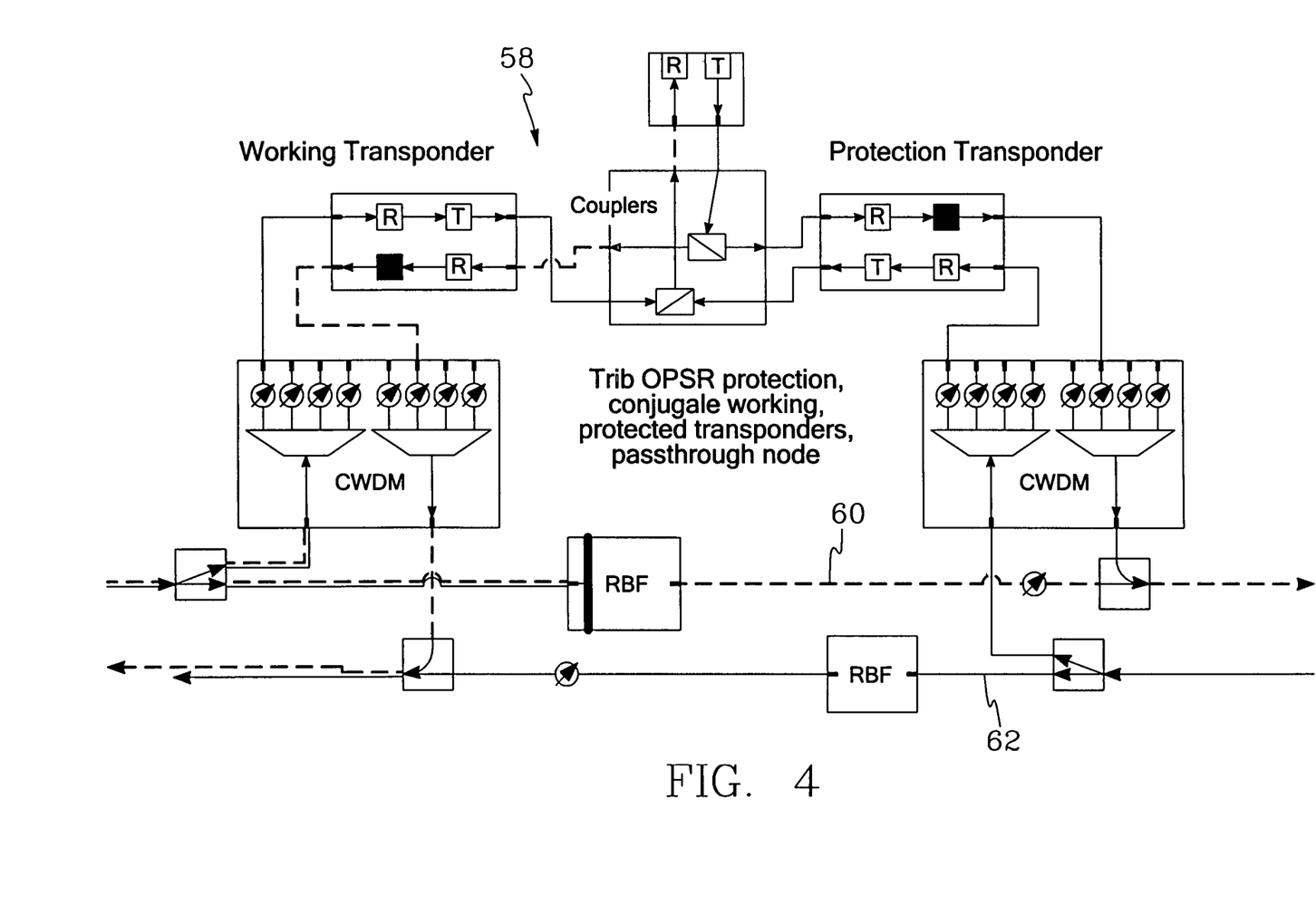
FIG. 4 is a schematic diagram of a tandem node formed in accordance with a preferred embodiment of the present invention.

Referring to FIG. 4, a node 58 identical to the node of FIG. 3 is depicted with the sole exception that node 58 is shown in the tandem mode in which the protection channels are expressed through the node 58. Specifically, the dashed line representing the protection wavelength 60 from transmitted from the left is expressed trough the node. Similarly, the solid line representing the protection wavelength 62 transmitted from the right is also expressed through the node 58.

When there is a failure, e.g., a cut fiber, intermediate nodes are to take the form of the tandem mode. To minimize switching time, the corresponding RBFs in the ring can be initially set to express the protection channels that are not used to carry extra traffic. Where the reconfigurable blocking filters are by default blocking filters or extra traffic is present, then the corresponding reconfigurable blocking filters must be reconfigured to express the protection channel or channels.

Presetting the corresponding RBF's to express the protection channel where no extra traffic is present, avoids the need for reconfiguring the RBF's in the event of a failure.

The CH-OSPR requires signaling between the nodes in the event of a fiber cut. Upon a fiber cut, the ROADM network and its OSC signaling channel operate as follows:

1. $R_x$ loss of signal (LOS) triggers a remote fault alarm to be sent to the $T_x$ on the other side of the ring and to all nodes;

2. Any extra traffic on the protection channel is dropped through the bridge and switch (not shown) connecting the source of extra traffic (not shown) to the protection transponder 38;
3. $T_x$ receives remote fault alarm, and switches traffic onto the protection channel on the other side of the ring via the coupler 48;
4. All intermediate nodes are to be in tandem mode, either through pre-setting if no extra traffic is present or subsequent reconfiguration of the reconfigurable blocking filters where extra traffic is present or the reconfigurable blocking filters are by default blocking channels; and,
5. $R_x$ does a tail end switch to receive traffic on the protection channel from the other side of the ring.

Where the reconfigurable blocking filters are preset to express the protection channels, re-circulating amplified spontaneous emissions (ASE) may be experienced. It may be necessary to place one or more of the RBF's in blocking mode to attenuate the re-circulating ASE where pass through is not required at all nodes.

Figure 5:
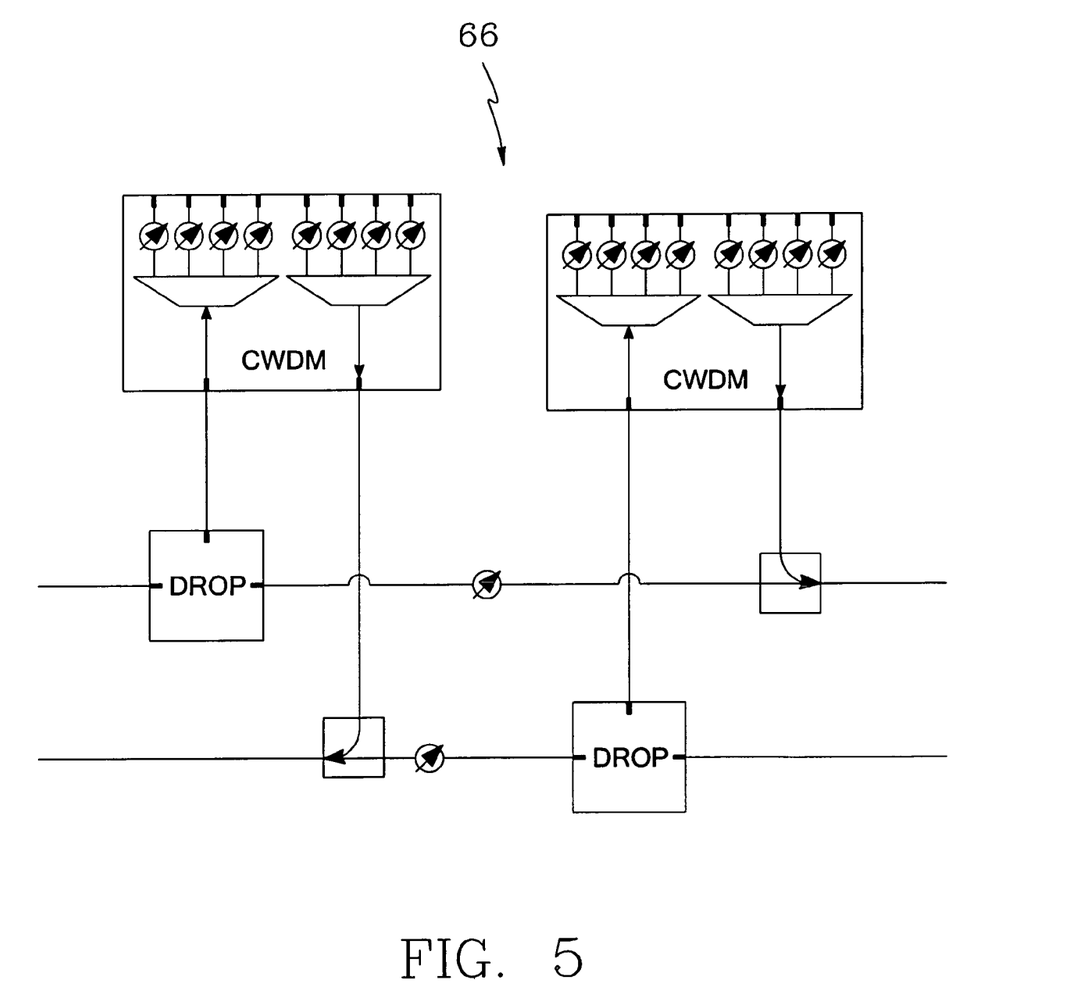
FIG. 5 is a schematic diagram of a switchable add/drop formed in accordance with an alternative embodiment of the present invention.

FIG. 5

Referring to FIG. 5, an alternative architecture 66 is presented. The ROADM in this embodiment is based on a switchable add/drop configuration. The switchable add/drop may address all channels, a subset of channels or a single channel. Switching is preferably achieved between express and drop within 10 ms in order to support the optical shared protection ring. A head/tail node must add/drop the protection channels and a tandem node must express the protection channels.

Figure 6:
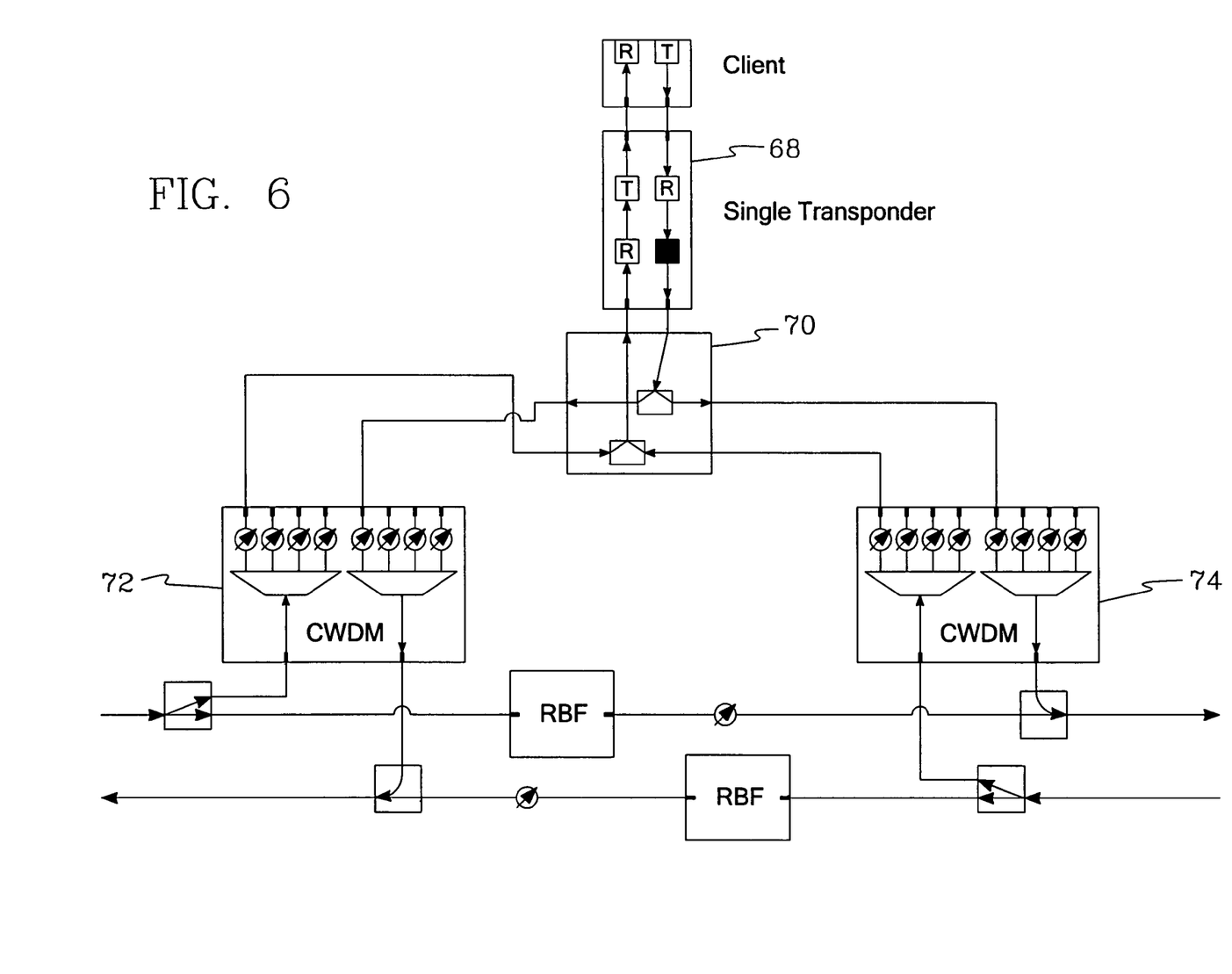
FIG. 6 is a schematic diagram of a head/tail node formed in accordance with another alternative embodiment of the present invention.

FIG. 6

Referring to FIG. 6, a further alternative architecture is presented. This embodiment is similar to the architecture depicted in Figure with the exception that a single transponder 68 in combination with a coupler and switch 70 is used. The coupler and switch 70 on the line side of the transponder perform the bridge and switch functions to selectively connect the working CWDM unit 72 and the protection CWDM unit 74 to the transponder 68. This architecture is designed to use conjugate working wavelength assignment. Since the protection wavelength is the same as the working wavelength a single transponder 66 can be used. As illustrated in FIG. 6, the architecture will not support extra traffic. An additional optical or electrical switch is required to switch the extra traffic in and out.

If an optical switch is used to selectively bridge the traffic, then the ROADM does not need to switch between add/drop and express for the protection channels for CH-OSPR protection. If the ROADM is left in pass through state for the protection channel, then bridging and switching at the head/tail end are the only requirements to support the tandem and head/tail switches. Protection channels through the ROADMs may be left in the pass through state, which may cause re-circulating ASE. In this event, it may be necessary that one or more of the ROADMs in the ring attenuates the pass through channel and be reconfigurable in as short a time as 10 ms.

The preferred embodiments of the present invention combine an ROADM WDM network with channel optical shared protection. As previously explained, a network of this nature has not been previously proposed. A network of this nature has significant advantages including: (a) remotely reconfigurable optical WDM network with wavelength reuse; (ii) protection bandwidth is available for extra traffic with little additional cost; (iii) wavelength reuse supports higher capacity per wavelength than dedicated protection; (iv) ROADM supports hitless upgrades; and, (v) ROADM is not constrained by wavelength plan, so wavelength reuse is easier to achieve.

I claim:

1. An optical network for transmitting information, said optical network comprising:
   an optical ring including a plurality of nodes and at least two fibers interconnecting said plurality of nodes during normal operation of said optical ring;
   each of said at least two fibers having a plurality of channels divided among working channels and protection channels; said working channels carry working traffic when no failures are present in said optical ring, said protection channels carry working traffic when there is a failure in a corresponding working channel; and
   at least one of said plurality of nodes having a reconfigurable add/drop multiplexer permitting wavelengths to be added, dropped and expressed from a location remote from the location of said at least one of said plurality of nodes; said reconfigurable add/drop multiplexer comprising a reconfigurable blocking filter for selectively adding/dropping a channel by remote configuration; said remote configuration comprising reconfiguration of the reconfigurable add/drop multiplexer from a remote site by configuring the reconfigurable blocking filter;
   wherein said reconfigurable blocking filter is initially set to express protection channels;
   wherein, responsive to said reconfigurable blocking filter initially set to express protection channels, one or more of the plurality of nodes selectively attenuates one or more pass through channels using a reconfigurable blocking filter in blocking mode at the one or more of the plurality of nodes in order to mitigate re-circulating amplified spontaneous emission caused by the express protection channels through said reconfigurable blocking filter;
   wherein said plurality of nodes includes a source node, a sink node and an intermediate node, at least one of said source node, said sink node and said intermediate node has at least one reconfigurable blocking filter for blocking a first type of traffic and expressing a second type of traffic; and
   wherein at least one of said source node, said intermediate node and said sink node includes a single transceiver and means for selectively connecting said single transceiver to said working channels and said protection channels for providing optical shared protection to said single transceiver.

2. An optical network as forth in claim 1, wherein:
   each of said source node, said sink node and said intermediate node has at least one reconfigurable blocking filter for blocking a first type of traffic and expressing a second type of traffic.

3. An optical network as set forth in claim 1, wherein:
   said intermediate node has a reconfigurable blocking filter operably connected to said working channels, said reconfigurable blocking filter is set to express at least one of said protection channels.

4. An optical network as set forth in claim 1, wherein:
   each of said plurality of nodes includes a working transponder and a protection transponder.

5. An optical network as set forth in claim 1, wherein:
   said optical ring includes at least three working paths, each of said working paths having the same working wavelength.

6. An optical network as set forth in claim 1, wherein:
each of said source node, said intermediate node and said sink node includes a single transceiver and means for selectively connecting said single transceiver to said working channels and said protection channels for providing optical shared protection to said single transceiver.

7. An optical network as set forth in claim 1, wherein:
said source node and said sink node are head/tail nodes and said intermediate node is a tandem node;
each of said source node, said sink node and said intermediate node includes a working transponder and a protection transponder; and
each of said source node and said sink node includes means for squelching said protection transponder during normal operation and where no extra traffic is present.

8. An optical network for transmitting information, said optical network comprising:
an optical ring having channel optical shared protection permitting extra traffic to be carried on at least one protection channel when no failures are present in said optical ring; and
said optical ring further including at least one reconfigurable add/drop wavelength division multiplexer permitting wavelengths to be added, dropped and expressed from a location remote from the location of said reconfigurable add/drop wavelength division multiplexer; said reconfigurable add/drop multiplexer comprising a reconfigurable blocking filter for selectively adding/dropping a channel by remote configuration; said remote configuration comprising reconfiguration of the reconfigurable add/drop wavelength division multiplexer from a remote site by configuring the reconfigurable blocking filter;
wherein said reconfigurable blocking filter is initially set to express at least one protection channel that is not used to carry extra traffic;
wherein, responsive to said reconfigurable blocking filter initially set to express protection channels, one or more of the plurality of nodes selectively attenuates one or more pass through channels using a reconfigurable blocking filter in blocking mode at the one or more of the plurality of nodes in order to mitigate re-circulating amplified spontaneous emission caused by the express protection channels through said reconfigurable blocking filter; and
wherein said wavelengths for working channels and the protection channels utilize conjugate wavelength assignment, wherein a single transceiver and means for selectively connecting said single transceiver to said working channels and said protection channels for providing optical shared protection to said single transceiver is used, and wherein a tunable laser is used to tune conjugate working wavelengths to approximate conjugate protection wavelengths.

9. An optical network as set forth in claim 8, further including:
a source node, a sink node and an intermediate node each having a working transponder and a protection transponder.

10. An optical network as set forth in claim 9, wherein:
each of said source node, said sink node and said intermediate node includes at least two reconfigurable blocking filters.

11. An optical network as set forth in claim 9, wherein:
each of said source node, sink node and intermediate node includes at least one switchable add/drop for switching between express and drop.

12. A method of transmitting information, said method including the steps of:
providing an optical network having an optical ring including a plurality of nodes and at least two fibers interconnecting the plurality of nodes during normal operation of the optical ring, each of said at least two fibers having a plurality of channels divided among working channels and protection channels;
providing at least one reconfigurable add/drop wavelength division multiplexer permitting wavelengths to be added, dropped and expressed from a location remote from the location of the reconfigurable add/drop wavelength division multiplexer; said reconfigurable add/drop multiplexer comprising a reconfigurable blocking filter for selectively adding/dropping a channel by remote configuration; said remote configuration comprising reconfiguration of the reconfigurable add/drop wavelength division multiplexer from a remote site by configuring the reconfigurable blocking filter;
transmitting bi-directional working traffic on the working channels; and
transmitting extra traffic on at least one protection channel when no failures are present in the optical ring;
wherein said reconfigurable blocking filter is initially set to express at least one protection channel that is not used to carry extra traffic;
wherein, responsive to said reconfigurable blocking filter initially set to express protection channels, one or more of the plurality of nodes selectively attenuates one or more pass through channels using a reconfigurable blocking filter in blocking mode at the one or more of the plurality of nodes in order to mitigate re-circulating amplified spontaneous emission caused by the express protection channels through said reconfigurable blocking filter; and
wherein said wavelengths for working channels and the protection channels utilize conjugate wavelength assignment, wherein a single transceiver and means for selectively connecting said single transceiver to said working channels and said protection channels for providing optical shared protection to said single transceiver is used, and wherein a tunable laser is used to tune conjugate working wavelengths to approximate conjugate protection wavelengths.

13. A method as recited in claim 12, including the step of:
pre-setting the at least one reconfigurable add/drop wavelength division multiplexer to express protection wavelength.

14. A method as recited in claim 12, including the further step of:
dropping the extra traffic from the protection channel when a failure associated with the corresponding working channel is detected.

15. A method as recited in claim 14, including the further step of:
after the step recited in claim 14, switching traffic previously transmitted on a working channel to a corresponding protection channel.

16. A method as recited in claim 12, including the further step of:
reconfiguring the reconfigurable wavelength division multiplexer from a location remote from the location of the reconfigurable wavelength division multiplexer.

17. A method as recited in claim 12, including the further step of:
transmitting traffic having the same working wavelength over three different working paths on the optical ring.

* * * * *